Patented May 12, 1942

2,283,150

UNITED STATES PATENT OFFICE 2,283,150

PROCESS OF PRODUCING OXIMES

Paul Schlack, Berlin-Treptow, Germany, assignor, by mesne assignments, to E. I. du Pont de Nemours and Company, Wilmington, Del.

No Drawing. Application November 27, 1939, Serial No. 306,431. In Germany November 28, 1938

6 Claims. (Cl. 260—566)

This invention relates to the production of oximes.

Oximes are produced on a technical scale from aqueous hydroxylamine salt solutions as they are obtained by the Raschig process. It has been found that in neutralizing these solutions in the presence of carbonyl compounds with alkalies or alkali carbonates the oximes, especially those of cyclic ketones can be obtained in good yield. Owing to the limited solubility of the alkali sulfates and alkali chlorides (in case the hydroxylamine is used as the chlorohydrate) it is not possible in this process to work with highly concentrated solutions. If the reaction is carried out in a highly concentrated solution, the reaction products are contaminated with inorganic salts which may be harmful in the further use of the oximes. These salts can be removed only by washing with a large amount of water, especially if the salts crystallize in large crystals. Since the solubility of many oximes in water is not negligible, losses are incurred in this manner.

It is an object of the invention to overcome the above described difficulties.

Further objects of the invention will become apparent from the detailed specification following hereinafter.

I have found that it is much more advantageous to neutralize the acids which are liberated during the oximation reaction with ammonia or volatile organic nitrogen bases or salts thereof with weak volatile acids. In this manner only the by-products which are obtained from the reaction are either of value as such or they are at least of such a nature that they can easily be worked up and recovered. It is possible to employ salts of ammonia or organic bases with weak volatile acids as they are obtained in the form of technical lyes, for instance, ammonium carbonate lye. The ammonium or amine salt solutions obtained may be further used as fertilizer salts, e. g., ammonium sulfate, or may be converted into free bases by distilling over lime. Dissolved or dispersed non-basic organic compounds, e. g., unreacted carbonyl compounds and impurities contained in the carbonyl compound which do not undergo oximation, for instance, alcohols or acids, and dissolved oxime must be removed from the solution. These impurities may be removed either by extraction with washing agents such as methylene chloride, butanol, chlorobenzene, or the liquid carbonyl compound, or by steam-distillation. If amine salts of weak volatile acids are used as neutralizing agents, the acid vapors which are driven off during the reaction may be employed for some other purpose or they may be converted to the ammonium salt for reuse in the process. The carbonyl compound and oxime contained in the acid gases may be recovered by means of active charcoal.

The use of ammonium salt solutions has the advantage that less heat is developed during the reaction. Ammonia and volatile amines may also be introduced into the reaction mixture in vapor form, especially if any further dilution of the reaction mixture with water must be avoided. In this case, of course, the cooling should be more efficient.

In order to aid the cooling from without or to be able to dispense therewith altogether the batches may be kept at a given low temperature by adding liquids which have a sufficiently low boiling point, for instance hydrocarbons and halogen substitution products thereof. The boiling points of these can be kept at any desired temperature by controlling the pressure in the vessel. Working with boiling solvents under reduced pressure is especially advantageous in the cases in which the oxime is to be further treated in solution. Instead of the volatile organic bases difficultly-volatile or non-volatile bases, for instance polyethylene amine bases or ethanolamine bases, can be employed. These solutions can be regenerated by double decomposition with soda.

*Example*

Into a vessel provided with a stirrer and a cooling jacket there are introduced 100 moles of cyclohexanone of 98 per cent purity, and 105 moles of hydroxylamine in the form of a hydroxylamine sulfate solution, containing 170 grams hydroxylamine base per liter. The mixture is stirred well as the oxime already begins to separate. Into this mixture there is poured slowly, while stirring and cooling, aqueous ammonia of 30 per cent strength, care being taken that the temperature does not rise above 25° C. It is essential for a good yield of the product that local concentration of high alkalinity in the reaction mixture be avoided. It is therefore advantageous to introduce the ammonia simultaneously at different places preferably below the surface of the reaction liquid. The neutralization is continued until the mixture is just no longer acid to Congo Red but still acid to litmus. The reaction mixture is stirred for another hour, filtered and washed several times with small amounts of ice water. The yield of practically pure product is about 95 per cent of the theoretical calculated on the ketone used.

I claim:

1. The process of producing cyclic ketoximes which comprises mixing a cycloalkanone with an aqueous solution of an inorganic salt of hydroxylamine, and neutralizing the liberated acid with a compound selected from the class of ammonia and aliphatic amines, said process being characterized in that it is carried out at a temperature below 25° C.

2. The process of producing cyclic ketoximes which comprises mixing a cycloalkanone with an aqueous solution of an inorganic salt of hydroxylamine, and neutralizing the liberated acid with ammonia, said process being characterized in that it is carried out at a temperature below 25° C.

3. The process in accordance with claim 1 characterized in that the reaction is carried out in the presence of a low boiling solvent for the oxime.

4. The process in accordance with claim 1 characterized in that the cycloalkanone is cyclohexanone.

5. The process in accordance with claim 1 characterized in that the reaction is carried out in the presence of a low boiling hydrocarbon solvent for the oxime.

6. The process in accordance with claim 1 characterized in that the reaction is carried out in the presence of a low boiling halogenated hydrocarbon solvent for the oxime.

PAUL SCHLACK.